Sept. 3, 1957     M. L. BLONDET ET AL     2,805,378
TAP CHANGING SYSTEM
Filed Feb. 10, 1956     2 Sheets-Sheet 1

Inventors:
Maurice L. Blondet,
Jean G. Bassiere,
by David P. Ogden
Their Attorney.

Sept. 3, 1957   M. L. BLONDET ET AL   2,805,378
TAP CHANGING SYSTEM
Filed Feb. 10, 1956   2 Sheets-Sheet 2

Inventors:
Maurice L. Blondet,
Jean G. Bassiere,
by David P. Ogden
Their Attorney.

United States Patent Office 2,805,378
Patented Sept. 3, 1957

2,805,378

TAP CHANGING SYSTEM

Maurice L. Blondet, Versailles, and Jean G. Bassieré, St. Germain-en-Laye, France, assignors to General Electric Company, New York, N. Y., a corporation Application February 10, 1956, Serial No. 564,808

Claims priority, application France February 14, 1955

13 Claims. (Cl. 318—414)

Our invention relates to control systems and more particularly to a control system for high potential voltage tapping from a single phase alternating voltage source supplying power to direct current motors such as are used on locomotives.

In order to accelerate direct current traction motors of variable speed device such as a locomotive, it is necessary to limit the voltage across the motors at low speeds thereof to prevent damaging overcurrents. As the motor speed increases under load to produce an increasing back voltage, the voltage applied to the motor must be increased in steps or notches which will maintain the current at a high but safe level. In this manner it is possible to accelerate a train at a maximum rate, with the motors safely producing a maximum torque. Usually in a system using an alternating power supply, a series of voltage taps are provided on the main transformer and the traction motors receive their voltage first from the lowest transformer tap and then successively higher voltage taps as the regulator or controller is advanced to the full voltage running position. In order to maintain acceleration at a maximum and safe rate, it has been the practice to provide many voltage taps with progression from minimum to maximum voltage. It has always been a problem with these systems to provide a maximum number of steps or notches with a minimum number of voltage taps, as well as a minimum load current in the taps, while maintaining a maximum current in the motors. A minimum current in the taps reduces the arcing damage and maintenance costs and a maximum current in the motors is necessary to provide maximum torque for accelerating under load. One arrangement for accomplishing this is to place all of the motors in series. However, this is dangerous and therefore impracticable because if one of the motors should drop a portion of its load, it would tend to increase its speed, and demand a larger portion of the voltage. This might result in excessive speeds which would destroy the motor. Another solution is to tap each end of the transformer winding and ground one end of each of the motors, and the center of the transformer winding. However, this solution requires twice as many voltage taps to provide similar voltage control.

Therefore, an object of our invention is to provide a simple and reliable circuit for coupling direct current motors to an alternating current supply system.

A further object is to provide a simple and reliable circuit connection between direct current motors and an alternating current supply system which is inherently balanced and adapted to use each voltage tap twice during acceleration.

In carrying out one form of our invention, direct current motors are connected in series across secondary windings of a transformer system provided with a high potential voltage tapping arrangement which effectively reduces the current carrying requirement of the tapping contacts. Our arrangement provides a center tap which remains in the electrical center of a composite secondary winding system and provides a convenient grounding point for the load system. In this manner we are able to provide parallel paths without the use of two sets of tap changing contacts. In our invention, the number of taps is reduced further by double use of each tap. Our invention also provides a ready means of determining any unbalance in the load such as might occur during wheel slip of the traction motors.

Further objects and advantages of our invention will become apparent and this invention will be better understood from the following detailed description with reference to the accompanying drawings. The features of novelty which characterize this invention will be pointed out with particularity in the claims annexed to and forming part of this specification.

In these examples we have assumed the question to be that of an electrical vehicle which runs on single phase alternating current and whose motors are run by rectifiers. However, our invention will work equally well with alternating current machines. In addition, only the necessary elements for understanding the invention have been shown with analagous elements in the different figures provided with identical references.

Figure 1:
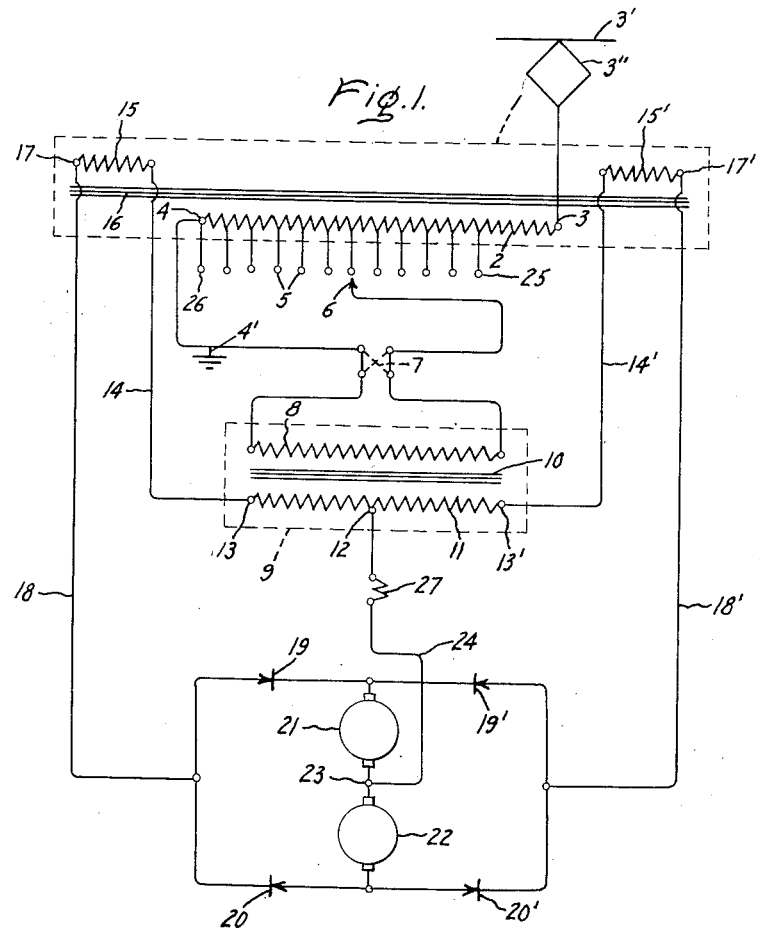
Fig. 1 is a schematic circuit showing one embodiment of our invention.

In the modification shown in Fig. 1, we have shown a main transformer 1 energized by an autotransformer winding 2 having a terminal 3 connected to a single phase alternating current line 3', through a current collector or pantograph 3" and through a circuit breaker or a usual protective apparatus of some sort, not shown. The other terminal 4 of the winding 2 is connected to the ground at 4' or to the other power line, not shown. In our present invention, the winding 2 energizes an arbitrary number of voltage taps 5, which through a voltage regulator, tap changer, or controller of some well known type represented schematically by a sliding contact 6, allows the utilization of all or a part of the winding 2 and yields graduated voltages following some desired progression as arithmetic or otherwise, depending upon the particular characteristics desired.

A reversing switch 7 allows the voltage to be applied in phase or out of phase with the voltage determined between the terminal 4 and the sliding contact 6 to a primary winding 8 of an auxiliary or reversing transformer 9, having a magnetic core 10 in which magnetic flux excursion excites a secondary winding 11, and energizes a center tap 12. We prefer to have the reversing switch 7 of some well known type which is constructed in such a way as not to break the circuit when it changes position.

Each of the end terminals 13 and 13' of the secondary winding 11 is joined by a connection, respectively 14 and 14', to a secondary winding, respectively 15 and 15', having a fixed number of turns, wound on the same magnetic core 16 as the autotransformer winding 2 of the main transformer 1.

The number of turns of the secondary windings 15 and 15' which are wound to produce identical voltages in the same direction. The turns of the secondary winding 11 of the auxiliary transformer 9 are arranged in such a way that when the primary winding 8 of auxiliary transformer 9 is energized with maximum voltage, the sum and the difference of the voltages which the composite current of the secondary windings 15 and 15' and 11 furnish are equal to the maximum and minimum voltages applied to rectifiers, this minimum voltage being substantially zero.

The end terminals 17 and 17' of the secondary windings 15 and 15' are joined through the connections 18 and 18' respectively, to the rectifiers or groups of rectifiers 19, 20 and 19' and 20' which are mounted in parallel paths. These terminals 17 and 17' are thus the end terminals of the composite secondary winding circuit and supply the voltage into two groups of similar and serially connected motors 21 and 22 of equal or relatively equal strength. In the case of locomotives or electrical vehicles, these motors are the traction motors.

A middle terminal or junction 23, in the center of the load of the two groups of motors 21 and 22, is joined by a connection 24 to the center tap 12 of the secondary winding 11 of the auxiliary or reversing transformer 9, which is also the center tap of the composite secondary winding circuit.

Operation

When the sliding contact 6 is in contact with a furthest voltage tap 25 and the reversing switch 7 being in positive position, the voltage of the winding 2 is in a negative connection and the output of the transformer 9 is in opposition with that of the secondary windings 15 and 15' which have a fixed number of turns. The voltage which is built up between the two terminals 17 and 17' and is applied to the rectifiers 19, 19', 20 and 20' is equal to the difference between the voltages supplied, on the one hand, by the two windings 15, 15' and, on the other hand, by the whole of the winding 11 between its two terminals 13, 13'. This voltage corresponds at its low point to the minimum voltage, which is, practically speaking, small or nothing.

In the next notch or step, the voltage regulator or controller is moved in such a way that the contact 6 is moved from the tap 25 toward a tap 26 which is connected to terminal 4. In this manner the voltage is varied, and current is passing through the contact 6 as the contact is moved successively across all of the intermediate taps 5 without breaking the current or shunting any of the turns of the autotransformer winding 2. Thus, the subtractive voltage produced by the secondary winding 11 is reduced progressively, and since the voltage between the end terminals 17 and 17' is the difference between the fixed voltage, produced by the secondary windings 15, 15', which have fixed number of turns and the decreasing voltage of the secondary winding 11 of the reversible transformer 9, it is increased simultaneously and proportionally.

When the voltage regulator or controller moves the sliding contact 6 to the end terminal 26, the primary winding 8 of the reversible transformer 9 is shunted from the circuit and the voltage produced by its secondary winding 11 is substantially zero. At this time, the voltage between the two end terminals 17, 17', applied to the rectifiers 19, 19', 20 and 20' is approximately one-half of the maximum allowable voltage and is equal to the sum of the voltages produced by the secondary winding 15, 15' alone.

At this moment the reversing switch 7 is moved from the positive position it occupied to the negative position. We prefer that this be accomplished without breaking the circuit nor changing the voltage applied to the rectifiers 19, 19', 20 and 20' or to the motors 21 and 22.

In order to further increase the voltage supplied to the traction motors, the voltage regulator or controller represented by the sliding contact 6 is moved in steps or notches, to contact successively with all of the taps 5 from the tap 26 toward the tap 25. The voltage produced by the secondary winding 11 of the reversible transformer 9 is now increasing and additive to that which is produced by the secondary windings 15 and 15'. The voltage applied to the rectifiers 19, 19', 20 and 20' and motors 21 and 22 increases uniformly up to a maximum, and a total of $2n-1$ voltage steps or notches are obtained, $n$ being the number of the voltage taps 5 of winding 2. The operation would be symmetric if one wanted to return the voltage by the reverse operation from maximum to zero.

In order to control the voltage applied to the load, or in the case of a locomotive to control the speed of operation, it is also possible to go through only part of the steps in one direction or the other with the voltage regulator or controller represented by the sliding contact 6 as long as the reversing switch 7 is operated only when the sliding contact 6 is on the voltage tap 26.

If the two motors 21 and 22, representing the pairs of groups of motors, are perfectly symmetric and, the voltage at the terminal 23 and at the terminal 12 identical even in the absence of the connection 24, no current will flow through connection 24. However, this is not always the case and the connection is to maintain the same voltage on the two groups of motors 21 and 22. Practically because of a slight variation in the load impedance characteristics, a small differential current will flow in connection 24. In the case of locomotives or electrical vehicles, this differential current can be momentarily important. If one or more wheels slip or slide on the track, the connection 24 carries a current proportional to the slip. We have found that this connection 24 is an excellent location for a sensing device or relay coil 27 which will automatically detect any wheel slip or skid and even indicate which motor or group of motors is driving the slipping axle. It is a relatively simple matter to connect means (not shown) to this coil 27 to regulate the voltage applied to this slipping group.

This connection 24 is also very important because it furnishes a safe point to ground the system. This is particularly valuable for a system using series traction motors which makes it a preferable practice to ground each of the motors at a point electrically as near the field windings as is feasible, because of the fact that we must design the field winding insulation as thermally conductive as is possible so that the motors can be properly cooled. At any time these field windings carry a voltage that is at a high potential relative to ground, the dielectric strength of the insulation is severely taxed and the chances of a failure are increased because of the fact that the motor frame is necessarily grounded in locomotive uses.

Figure 2:
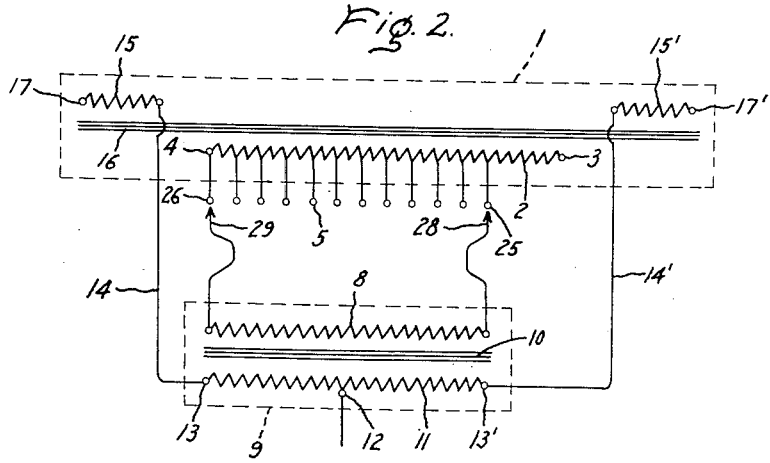
Fig. 2 is a schematic circuit showing another embodiment of our invention.

Figure 2 represents another modification of our invention. In this variation, the reversing switch 7 of Fig. 1 is omitted, and the voltage regulator or controller has two variable contacts 28 and 29 which move in opposite directions on the voltage taps 5. The autotransformer winding 2 of main transformer 1 energizes the voltage taps 5, 25 and 26, and the sliding contacts 28 and 29 move from one tap to the next alternately, one after the other and in opposite directions after leaving the end taps 25 and 26. Each of these voltage contacts 28 and 29 is adapted to connect independently to each of the voltage taps 5 from one end 25 to the other end 26.

We prefer that in the position indicated in Fig. 2 when the sliding contact 28 is at the voltage tap 25 and the contact 29 at tap 26, the voltage produced by the secondary winding 11 of the reversible transformer 9 is a maximum and subtractive with respect to the voltage of the secondary windings 15 and 15' which have a fixed number of turns. On the other hand, the voltage is maximum and additive with respect to the windings 15 and 15' when the sliding contact 28 is moved to the tap 26 and contact 29 is moved to the tap 25. Thus, with the same number of taps as in the invention of Fig. 1, the same number of voltage steps are obtained without a reversing switch.

Figure 3:
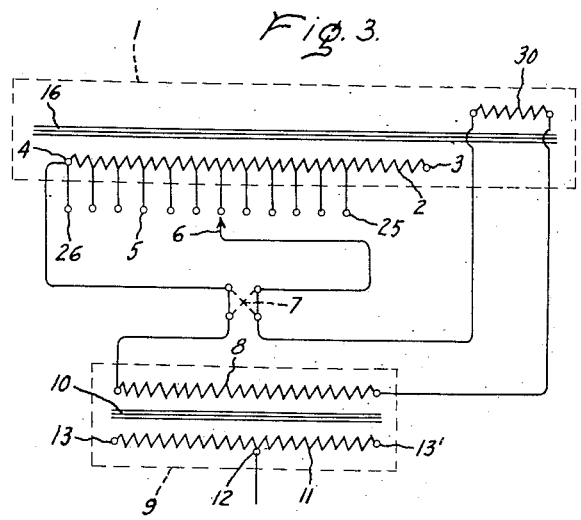
Fig. 3 is a schematic circuit showing still another embodiment of our invention.

Another modification of our invention is represented in Fig. 3 where a single secondary winding 30 of the main transformer 1 is connected across the reversing switch 7 in series with the primary winding 8 of the auxiliary transformer 9 and with part of the autotransformer winding 2 which is included between the terminal 4 and the sliding contact 6 representing the voltage changer or controller.

The operation of Fig. 3 is analagous to those examples of Fig. 1. In Fig. 3 the reversing switch 7 allows us to obtain a variable voltage equal to the sum or the difference of the fixed voltage of the secondary 30 and the variable voltage determined between the terminal 4 and the voltage regulator or controller represented by the sliding contact 6. This variable voltage is applied to the primary winding 8 of the auxiliary transformer 9, whose secondary winding 11 delivers between the terminals 13 and 13′, which in this case are equivalent to the composite secondary winding terminals 17 and 17′, a variable voltage proportional to the sum or difference, of the windings 2 and 30, which is applied to the rectifiers and to the motors (which are not shown).

The actual arrangement depicted in referring to Figs. 1 through 3, given as examples, are susceptible to many variations which should be considered as part of this invention.

In particular, the voltage can be divided into an arbitrary number of groups of motors in pairs. These groups are energized, taken as a whole, by a common group of single anode rectifiers set up in parallel rows, or separately by a distinct group of single anode rectifiers set in parallel rows. In each such arrangement it is feasible to ground the center tap 12 and connect a wheel slip indicator relay coil 27 between ground and the motor center tap connection 23.

The secondary windings with a fixed number of turns of the main transformer 1 could be divided also into a number of parallel parts, the voltage being equal in the parts into which it is divided, or into a sub-multiple of this number where the parts of the winding can be distributed among them in such a way as to equalize the voltage distribution, and maintain the center tap 12 at the electrical center of the composite secondary winding system.

The main transformer 1, for example, can possess also other windings for feeding the auxiliary loads.

What we claim as new and desire to secure by Letters Patent of the United States is:

1. In combination with a main transformer having an autotransformer winding provided with voltage taps thereon, said transformer having another winding, an auxiliary transformer having a primary winding and a secondary winding, electric circuit means connecting said voltage taps to said primary winding for selectively varying the voltage supplied by said autotransformer winding to said secondary winding from a maximum value of one polarity to a maximum value of the opposite polarity, and means connecting said secondary winding in circuit with said other winding and a load whereby the voltage applied to said load is proportional to the sum of the voltage tapped from said voltage taps and the voltage across said other winding, said sum being variable from a minimum predetermined value where the voltage output of said main transformer windings is subtractive to a predetermined maximum value where the voltage output of said main transformer winding is additive.

2. In combination with a main transformer having an autotransformer winding provided with voltage taps thereon, said transformer having another winding, an auxiliary transformer having a primary winding and a secondary winding, electric circuit means connecting said voltage taps to said primary winding for selectively varying the voltage supplied by said autotransformer winding to said secondary winding of said auxiliary transformer from a maximum value of one polarity to a maximum value of the opposite polarity, means connecting said secondary winding in circuit with said other winding and a load whereby the sum of the voltages of said secondary winding and said other winding is applied to said load, said sum being variable from a minimum predetermined value where the voltage output of said secondary winding is maximum and subtractive from said voltage output of said other winding to a predetermined maximum value where the voltage output of said secondary and said other windings is maximum and additive.

3. In combination with a main transformer having an autotransformer winding provided with a plurality of voltage taps, said main transformer having a pair of secondary windings each having a similar number of turns, an auxiliary transformer having a primary winding and a secondary winding provided with a center tap, electric circuit means adapted to connect said voltage taps to said primary winding for selectively varying the voltage of said secondary winding of said auxiliary transformer from a maximum value of one polarity to a maximum value of the opposite polarity, other electric circuit means connecting one of said pair to each end of said secondary winding of said auxiliary transformer to form a composite secondary circuit wherein said center tap remains substantially at the potential center of said circuit, and connections for connecting said circuit to a load whereby the sum of the voltages of said secondaries is applied thereto, said sum being variable from a predetermined minimum value where the voltage output of said secondary winding of said auxiliary transformer is subtractive from the potential of said circuit to a predetermined maximum value where the voltage output of said secondary winding of said auxiliary transformer is additive to the potential of said circuit.

4. In combination with a main transformer having an autotransformer winding provided with a plurality of voltage taps, said main transformer having a pair of secondary windings each having a similar number of turns, an auxiliary transformer having a primary winding and a secondary winding provided with a center tap, electric circuit means adapted to connect said voltage taps to said primary winding for selectively varying the voltage of said secondary winding of said auxiliary transformer from a maximum value of one polarity to a maximum value of the opposite polarity, other electric circuit means connecting one of said pair to each end of said secondary winding of said auxiliary transformer to form a composite secondary circuit wherein said center tap remains substantially at the potential center of said circuit, connections for connecting said circuit to a load including a pair of serially connected electric motors whereby the sum of the voltages of said secondaries is applied thereto, said sum being variable from a predetermined minimum value where the voltage output of said secondary winding of said auxiliary transformer is subtractive from the potential of said circuit to a predetermined maximum value where the voltage output of said secondary winding of said auxiliary transformer is additive to the potential of said circuit, and a junction between said motors adapted to be connected to said center tap, whereby the voltage applied to one of said motors will substantially equal half of the potential across said circuit.

5. In combination with a main transformer having an autotransformer winding provided with a plurality of voltage taps, said main transformer having a pair of secondary windings each having a similar number of turns, an auxiliary transformer having a primary winding and a secondary winding provided with a center tap, electric circuit means adapted to connect said voltage taps to said primary winding for selectively varying the voltage of said secondary winding of said auxiliary transformer from a maximum value of one polarity to a maximum value of the opposite polarity, other electric circuit means connecting one of said pair to each end of said secondary winding of said auxiliary transformer to form a composite secondary circuit wherein said center tap remains substantially at the potential voltage center of said circuit, connections for connecting said circuit to a load whereby the sum of the voltages of said secondaries is applied thereto, said sum being variable from a predetermined minimum value where the voltage output of said secondary winding of said auxiliary transformer is subtractive from the potential of said circuit to a predetermined maximum value where the voltage output of said auxiliary transformer is additive to the potential of said circuit, a junction between said motors, and a sensing means connected between said center tap and said junction for detecting any differential current flow in one of said motors.

6. The combination of an autotransformer winding provided with a plurality of voltage taps, a pair of secondary windings provided with an equal number of turns magnetically connected to said winding, an auxiliary transformer having a primary winding adapted to be connected selectively to said voltage taps and a secondary winding provided with a center tap, said secondary winding adapted to have each end connected to one end of said pair of secondary windings to form a composite secondary winding circuit so that the voltage between the other end of each of said pair of windings and said center tap is substantially equal in magnitude to the one-half the voltage of said circuit, load means including a pair of serially connected dynamoelectric machines having a junction therebetween, means adapted to be grounded for connecting said center tap and said junction, means connecting said load between each of said other ends of said pair of secondary windings, and tap changing means connected to said primary winding for connecting said autotransformer winding thereto in a predetermined arrangement whereby the voltage in said secondary winding of said auxiliary transformer may be varied between a maximum voltage out of phase with said pair of windings to a maximum voltage in phase with said pair of windings.

7. The combination of a main transformer having an autotransformer winding provided with a plurality of voltage taps, said main transformer having a pair of secondary windings provided with an equal number of turns, an auxiliary transformer having a primary winding adapted to be connected selectively to said voltage taps and a secondary winding provided with a center tap, said secondary windings to form a composite secondary winding circuit so that the voltage between the other end of each of said pairs of windings and said center tap is substantially equal in magnitude to one-half the voltage of said circuit, load means including a pair of serially connected direct current motors having a junction therebetween, means for connecting said center tap and said junction, rectifier means connected respectively between each of said other ends of said pair of secondary windings and one end of said load means, for providing unidirectional current to said load means, tap changing means connected to said primary winding for connecting said autotransformer winding thereto in a predetermined arrangement whereby the voltage in said secondary winding of said auxiliary transformer may be varied between a maximum voltage and a minimum voltage, and a reversing switch adapted to connect said primary winding so that the output of said secondary winding may add to or subtract from the output of said pair of windings.

8. The combination of an autotransformer winding provided with a plurality of voltage taps, a pair of secondary windings provided with an equal number of turns magnetically connected to said winding, an auxiliary transformer having a primary winding adapted to be connected selectively to said voltage taps and a secondary winding provided with a center tap, said secondary winding adapted to have each end connected to one end of said pair of secondary windings to thus form a composite secondary winding circuit so that the voltage between the other end of each of said pair of windings and said center tap is substantially equal in magnitude to the one-half the voltage, load means including a pair of serially connected dynamoelectric machines having a junction therebetween, connection means for connecting said center tap and said junction, current sensing means in said connection means for indicating any differential current flow therein, means connecting said load between each of said other ends of said pair of secondary windings, and switch means connected to said primary winding for connecting said voltage taps of said autotransformer winding thereto in a predetermined arrangement whereby the voltage in said secondary winding of said auxiliary transformer may be varied between a maximum voltage out of phase with said pair of windings to a maximum voltage in phase with said pair of windings.

9. In a control system combination, a main transformer having a pair of similar secondary windings and an autotransformer winding with a plurality of voltage taps thereon, one end of said autotransformer winding being adapted to be connected to ground and the other end of said autotransformer winding being adapted to be connected to an alternating current source, an auxiliary transformer having a primary winding and a secondary winding, one end of said primary winding being connectable to said one end of said autotransformer, a plurality of tap-changing switches operable sequently to connect the other end of said primary to successive taps on said autotransformer winding, switching means connected in circuit with said primary winding for reversing the connections of said one end and said other end of said primary winding, said secondary winding being provided with a center tap and being connected in a composite secondary circuit between said pair of windings so that the voltage between said center tap and each end of said composite secondary circuit is substantially half the voltage between the ends of said composite secondary circuit, a load including a pair of serially connected dynamoelectric machines connected across said composite secondary circuit to receive power therefrom, a junction between said machines, connections connecting said junction to said center tap to assure substantially equal voltage applied to each of said machines, and a current sensing means serially connected in said last named connections to detect any substantial current flow therein whereby relative speed of said machines may be indicated.

10. In a control system combination, a main transformer having a pair of similar secondary windings and an autotransformer winding provided with a plurality of voltage taps thereon, one end of said autotransformer winding being adapted to be connected to ground and the other end of said autotransformer winding being adapted to be connected to an alternating current source, an auxiliary transformer having a primary winding and a secondary winding, a reversing switch for connecting one end of said primary winding to said one end of said autotransformer winding, a plurality of tap-changing switches operable sequentially to connect the other end of said primary to successive taps on said autotransformer winding, said secondary winding being provided with a center tap and being connected in a composite secondary circuit with said pair of windings so that the voltage between said center tap and each end of said composite secondary circuit is substantially half the voltage between the ends of said composite secondary circuit, a load including a pair of serially connected dynamoelectric machines connected across said composite secondary circuit to receive power therefrom, a junction between said machines, and connections connecting said junction to said center tap to assure substantially equal voltage applied to each of said machines.

11. In a control system combination a main transformer having a pair of similar secondary windings and an autotransformer winding with a plurality of voltage taps thereon, one end of said autotransformer being adapted to be connected to ground and the other end of said transformer being adapted to be connected to an alternating current source, an auxiliary transformer having a primary winding and a secondary winding, tap changes connected to each end of said primary winding being operable sequentially to connect said ends to successive taps on said autotransformer winding, said secondary winding being provided with a center tap and being connected in a composite secondary circuit with said pair of windings so that the voltage between said center tap and each end of said composite secondary circuit is substantially half the voltage between the ends of said composite secondary circuit, a load including a pair of serially connected dynamoelectric machines connected across said composite secondary circuit to receive power therefrom, a junction between said machines and connections connecting said junction to said center tap to assure substantially equal voltage applied to each of said machines.

12. In combination with a pair of serially connected electric motors having a grounding junction therebetween, a circuit and tap changing arrangement for regulating the voltage supplied to the motors comprising, a main transformer having an autotransformer winding provided with a plurality of voltage taps thereon, said transformer being provided with another winding, an auxiliary transformer having a primary winding and a secondary winding provided with a center tap adapted to be grounded whereby it is connected to the junction between the motors, circuit means connecting said voltage taps, said other winding and said auxiliary transformer with said pair of motors so that said other winding supplies a constant voltage to said pair of motors, and tap changing means for selectively varying connections between said primary winding and said voltage taps of said autotransformer winding whereby a predetermined maximum voltage or portions thereof may be subtracted from or added to said voltage supplied by said other winding to said pair of motors.

13. In combination with a pair of serially connected electric motors having a junction therebetween adapted to be connected to ground, a circuit and tap changing arrangement for regulating the voltage supplied to the motors comprising, a main transformer having an autotransformer winding provided with a plurality of voltage taps thereon, said transformer being provided with another winding, an auxiliary transformer having a primary winding and a secondary winding provided with a center tap adapted to be grounded whereby it is connected to the junction between the motors, circuit means connecting said voltage taps, said other winding and said auxiliary transformer with said pair of motors so that said other winding furnishes a constant voltage to said pair of motors, tap changing means for selectively varying connections between said primary winding and said autotransformer whereby a predetermined maximum voltage or portions thereof may be subtracted from said voltage supplied by said other winding to said pair of motors, a reversing switch connected in circuit with said primary winding and said tap changing means whereby said predetermined maximum voltage or portions thereof may be added to said voltage supplied by said other winding to said pair of motors, and a sensing means connected between said junction and ground for indicating any differential current in the motor circuit.

No references cited.